United States Patent

[11] 3,589,247

| | | |
|---|---|---|
| [72] | Inventor | Hillebrand Johannes Josephus Kraakman<br>Emmasingel, Eindhoven, Netherlands |
| [21] | Appl. No. | 858,382 |
| [22] | Filed | Sept. 16, 1969 |
| [45] | Patented | June 29, 1971 |
| [73] | Assignee | U. S. Philips Corporation<br>New York, N.Y. |
| [32] | Priority | Sept. 18, 1968 |
| [33] | | Netherlands |
| [31] | | 6813304 |

[54] PISTON SEALING CONTROL SYSTEM
4 Claims, 1 Drawing Fig.

[52] U.S. Cl. ..................................................... 92/111,
92/127, 92/165, 92/181, 91/422
[51] Int. Cl. ..................................................... F01b 31/00
[50] Field of Search.......................................... 92/162-
—165, 109—113, 51, 61, 65, 81, 82, 146, 181,
182, 127; 91/422; 277/70; 308/363

[56] References Cited
UNITED STATES PATENTS

| 2,754,847 | 7/1956 | Ashton et al................. | 92/51 X |
| 3,319,534 | 5/1967 | Boonshaft ..................... | 92/162 |

Primary Examiner—Martin P. Schwadron
Assistant Examiner—Allen M. Ostrager
Attorney—Frank R. Trifari ABSTRACT: A control system for sealing a hydrostatically journaled working piston against the wall of a cylinder carrying the piston. The cylinder is closed at both ends and the piston is provided with a piston rod extending through one of the closed cylinder ends for supplying effective work. Means are provided for supplying fluid under pressure so that the pressure acts on both end faces of the piston. The piston has a pair of circumferential grooves on its circumferential surface and a plurality of shallow chambers about its surface in between the grooves for hydrostatically journaling the piston in the cylinder. A control element, comprising a piston assembly, is mounted within said piston centrally located therein and extending longitudinally therethrough. The piston assembly comprises three separate piston elements with connecting rods between them, chambers being formed between each of the pistons and between the end pistons and the control element walls. Duct means are provided for communicating between one of the chambers between the pistons and one of the circumferential grooves and other duct means are provided for communicating between the other circumferential groove and the space adjacent one end face of the working piston. The diameters of the end faces of the piston assembly are unequal and having a ratio to each other corresponding to the ratio of surface area of the two end faces of the working piston so that the pressure exerted on both ends of the working piston is the same as the pressure exerted on the corresponding ends of the piston assembly.

PATENTED JUN29 1971 3,589,247
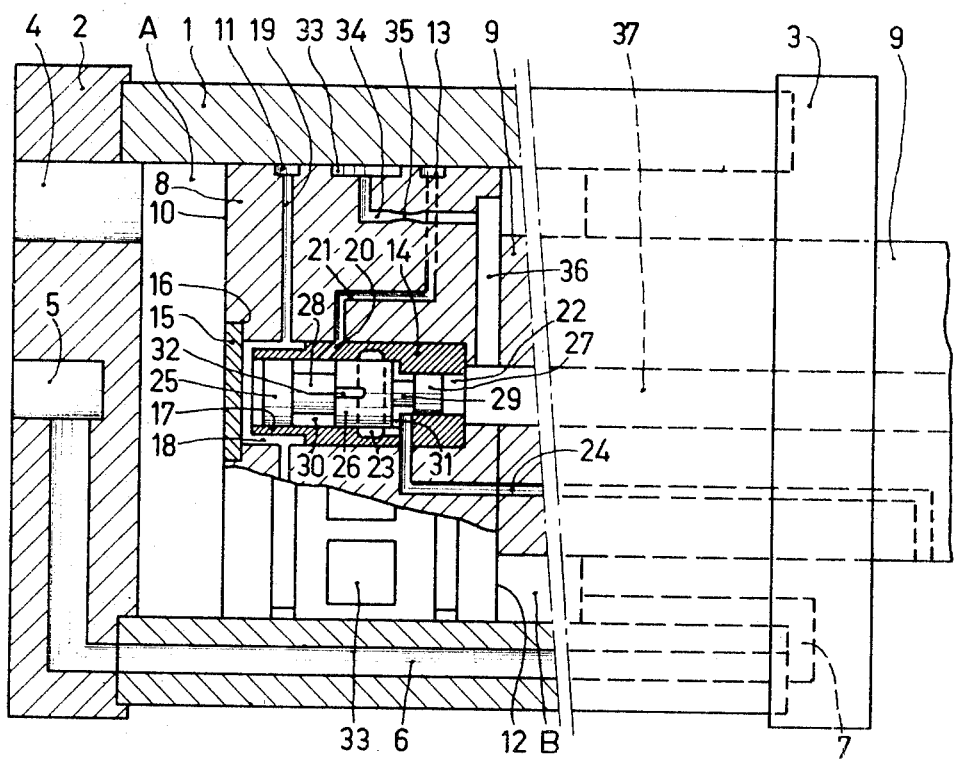
INVENTOR.
HILLEBRAND JJ KRAAKMAN
BY
AGENT

PISTON SEALING CONTROL SYSTEM

The invention relates to a device for sealing a hydrostatically journaled piston against the wall of a cylinder which is closed at either end. The piston is provided on at least one side, with a piston rod supplying effective work, and a fluid pressure acts on both end faces of the piston. The piston rod, which preferably is also hydrostatically journaled therein, and supplies the effective work and is passed to the outside through a cylinder cover. The circumference of the piston has at least two grooves, one of which is situated near the end face of the piston to which the piston rod is secured and the other is situated near the other end face of the piston.

It is often advantageous, particularly for machine tools, such as, lathes, milling machines, grinding benches and the like, with which extremely accurate parts are to be manufactured requiring optically accurate surfaces, to use a linear motor for the displacement and/or localization of the part to be machined and/or the chisel, cutter or grinding stone. In the conventional drive the rotation of a screw-spindle with a transport nut is converted into a linear movement with which error sources are present which cause inadmissible errors in size and roughness. Moreover, the pitch of the screw-spindle is usually found repeated on the workpiece. Furthermore, even very small alignment errors produce periodically disturbing forces in the machine which are visible on an accurately machined surface. When, however, requirements of accuracy of size are in the range of 0.1 $\mu$ and roughness tolerances are within ½ ru = approximately 0.01 $\mu$, the screw-spindle drive is no longer suitable and a drive by a piston-cylinder combination is the appropriate solution. In producing parabolic mirrors of metal it has been found, for example, that the light reflection with a piston-cylinder drive is 20 percent higher than with a very accurate screw-spindle drive of the workpiece and/or the cutting tool. With such a piston-cylinder combination a constant piston speed can be achieved with deviations in speed within 0.1 percent, if:

1. the cylinder diameter is equal in any cross section;
2. the supply pressure of the liquid on the piston and the external load remain constant, and
3. the leak flow along the piston is constant and as small as possible.

The second condition is relatively easy to achieve; the first and third conditions however, are more difficult to achieve since the dynamic seal of the piston against the entire cylinder wall may not influence the travel properties of the piston.

The invention provides a solution to the problem of the satisfactory seal of the piston and is characterized in that in a hydrostatically journaled piston as described above, a continuously adjustable element is provided in the piston so that in any piston position a fluid pressure occurs in the second groove which is substantially equal to the fluid pressure in the space between the end face of the piston situated near said groove and the cylinder cover situated opposite thereto. The position of said element is determined exclusively by a fluid pressure which is exerted on the element and which is equal to the difference in the fluid pressure between the spaces on either side of the piston.

According to an embodiment of the invention the bearing and the seal are improved by providing a number of shallow chambers between the grooves in the circumference of the piston. The chambers communicate through a duct, which has a fixed resistance, to the space between the end face of the piston having the piston rod and the cylinder cover situated opposite thereto. The fluid which moves the piston is supplied under pressure to said space.

Another improvement of the seal is obtained if, according to a further embodiment of the invention, a duct is provided between the first groove and a space situated outside the cylinder, in which space a pressure prevails smaller than the liquid pressure which is exerted on the piston and is preferably equal to atmospheric pressure. The said duct comprises a resistance which is adjustable by the movement of the element.

A simple construction of this element is obtained if said element, according to another embodiment of the invention, consists of a cylinder which is closed on one side and is secured in the piston in a liquid-tight manner, the cylinder comprising three rigidly secured and spaced pistons movable in said cylinder, the connection rods between the pistons having a smaller diameter than said pistons and the cylinder wall comprising an approximately radially extending aperture which at one end communicates with the duct of the first groove and at the other end opens into a chamber situated between two pistons, said chamber communicating with an annular chamber in the inner wall of the cylinder through an outlet port which is adjustable by the movement of the piston assembly and constitutes the adjustable resistance. The circumference of the central piston forms one wall of said chamber, the chamber communicating with the space in which a lower pressure prevails than the working pressure, regardless of position of the piston.

According to still a further embodiment of the invention by which a simple and efficacious buildup of pressure in the second groove and an accurate adjustment of the three pistons are obtained, an outer side face of an outermost piston of the element constitutes a wall of a chamber into which the duct of the second groove opens, while the outer face of the other outermost piston lies in a chamber which communicates through an open duct with the space which is bounded on one side by the side face of the piston to which the piston rod which supplies the effective work is secured and on the other side is bounded by a cylinder cover, in which chamber the working pressure prevails.

In order that the invention may be readily carried into effect one embodiment thereof will now be described in greater detail, by way of example, with reference to the accompanying drawing the sole FIGURE of which shows a partly diagrammatic cross-sectional view through a cylinder with hydrostatically journaled piston with piston rod situated therein.

Reference numeral 1 in the drawing denotes a cylinder which comprises two cylinder covers 2 and 3. The cylinder cover 2 comprises a liquid outlet aperture 4 and a liquid inlet aperture 5 which communicates with a duct 6 in the cylinder wall. This duct 6 communicates with a duct 7 in the cover 3.

A piston 8 having a piston rod 9 secured thereto which is passed through the cover 3, is journaled in the cylinder 1. Both the piston 8 and the rod 9 are hydrostatically journaled; the bearing of the piston 8 will be described in detail. Near one end face 10 of the piston 8 an annular groove 11 is provided on the circumference of the piston; near the end face 12 to which the rod 9 is secured, a corresponding annular groove 13 is provided in the circumference of the piston.

Situated in the piston is a cylinder 14 which is introduced into the piston through an aperture 16 covered by a coverplate 15. One end 17 of the cylinder has a slightly smaller diameter so that a chamber 18 is formed which communicates with the groove 11 through a duct 19. The cylinder furthermore comprises an aperture 20 which communicates with the groove 13 through a duct 21. On the other side, opposite to the end 17, the cylinder has a smaller inside diameter 22. Finally, the cylinder 14 has a chamber 23 on its inside which communicates, through a duct 24 which extends through the piston rod, with the outside air.

In the cylinder 14 three pistons 25, 26 and 27 are situated, the pistons 25 and 26 of which have the same diameters, while the piston 27, which is situated in the part 22 of the cylinder having a smaller inside diameter, has a corresponding smaller diameter than the pistons 25 and 26. The pistons 25 and 26 are rigidly secured together by a rod 28; the pistons 26 and 27 by a rod 29. It is obvious that in the manner chambers are formed between the pistons; these chambers are denoted by 30 and 31. The piston 26 has at least one V-shaped recess 32 at its circumference.

On the circumference of the piston 8 between the annular grooves 11 and 13 a number of shallow chambers 33 are situated which each communicate, through a duct 34 having a fixed resistance 35, with the space between the end face of the piston and the cover 3, into which space the channel 7 also opens. The cover 3 furthermore comprises an elongated part extending in the cylinder 1 in which a device (not shown) is present with which the piston rod can be journaled hydrostatically and with which the piston rod can be clamped, if desirable.

Although the device shown may have many applications, it is particularly intended for use in a lathe for ultrafine machinings, in which, for example, the requirement of accuracy of size is in the range of 0.1 $\mu$ and a roughness tolerance of the machined surface is ½ ru = approximately 0.01 $\mu$, for example, a diamond chisel or the object to be machined can be secured to the end face of the piston rod 9.

The operation of the device is as follows:

Liquid under pressure, for example, oil, is introduced into the space B through the aperture 5 via ducts 6 and 7 against the right-hand side face of the piston. In a practical embodiment of the cylinder piston combination the pressure was approximately 40 atm. The oil can leave the space B through a recess 36 in the piston and a duct 37 in the piston rod. Behind the piston in the space A oil under pressure is supplied through the aperture 4. It is obvious that the position of the piston is determined exclusively by the difference in pressure in front of and behind the piston, naturally in combination with the size of the surfaces on which said pressures are operative. By varying, for example, the pressure in A, a purely linear piston movement can be obtained. However, the speed of the piston can be constant only if the above-mentioned conditions are satisfied, in which the second condition can be simply realized. However, those under first and third cannot. Without special measures, speed variations may occur of from one to two percent while a speed variation of only 0.1 percent is admissible. With regard to the first condition: when the cylinder diameter is 80 mm. the deviations in the diameter may be at most 4 $\mu$; owing to the different pressure levels in the cylinder at a supply pressure of 40 atm., variations in diameter of 10 $\mu$ rapidly occur owing to the deformation of the cylinder together with machining errors in the inner bearing surface. In this case structural measures can be taken which will not be described in detail. Finally, as previously mentioned, the travel properties of the piston may not be influenced by the seal of the piston.

The average bearing chamber pressure prevails in the annular groove 11, which pressure consequently also prevails in the space 18 behind the piston 25 of the control valve through the duct 19. The supply pressure is operative on the piston 27. As previously mentioned, the annular groove 13 communicates with the space 30 between the pistons 25 and 26 through duct 21 and aperture 20. The liquid in this space exerts no force on the piston combination 25, 26 and 27. The pressure of the liquid in the annular groove 13 is controlled by the aperture of the outlet port which is formed by the recess 32 and the chamber 23, which outlet port constitutes a resistance the value of which depends upon the adjustment of the piston combination 25, 26, 27 in the cylinder 14.

If there is no external load on the piston rod 9 and the piston 8 is in the equilibrium condition, the pressure of the liquid in the space A will be in a fixed ratio with the pressure of the liquid in the space B, which ratio is determined by the size of the surfaces 10 and 12 of the piston 8 on which the liquid in the spaces A and B is operative. If the same ratio is given to the surfaces of the pistons 25 and 27 of the control valve, the piston combination 25, 26, 27 will adjust in an equilibrium condition in which the liquid pressure in the space 18 must be equal to the pressure in the space A. The liquid pressure in the space 18 also prevails in the annular groove 11 and the pressure at the annular groove 11 is again equal to the pressure in the bearing chambers 33. Hence a pressure will prevail in the bearing chambers 33 which is equal to the pressure in the space A. So in the equilibrium condition of the piston 8 and the control valve no leak of space A across the piston occurs. For example, should the pressure in the bearing chambers drop by some cause or other, the pressure in the annular groove 11 (which is equal to the pressure of the bearing chamber) and in the chamber 18 will also be reduced. The piston combinations 25, 26, 27 then moves to the right. The outlet port which is constituted by the recess 32 and the chamber 23 becomes smaller and the resistance for the liquid flowing through the duct 21 becomes larger so that hence the pressure in the annular groove 13 increases. As a result of this also the pressure in the bearing chambers 33 again increases and the piston combination 25, 26, 27 again assumes an equilibrium condition in which the pressure in the bearing chambers 33 is equal to the pressure in the space A. The control valve thus ensures that with an external load of the piston 9 equal to zero no leakage from space A across the piston 8 occurs.

When an external force is indeed operative on the piston rod 9, the pressure in the space A will not be equal to the pressure in the bearing chambers 33. However, the external load, for example, in precision cutting with the above-described great accuracy, is very low and moreover substantially constant. Therefore, a very small and constant leak flow from space A along the piston 8 will occur so that no nonuniform speed of the piston 8 will occur.

So the third condition: that the leakage flow along the piston be constant and as small as possible, is hence achieved. Furthermore, the first condition is no longer of decisive significance: unequalities in the cylinder diameter are compensated for by the pressure control since the leak flow along the piston remains constant and as small as possible.

It should be noted that the place where the pressure is measured (behind the piston 25) is separated from the place where the pressure is controlled (recess 32, chamber 23). The liquid, the pressure of which is to be controlled (in chamber 18) does not flow. The liquid which flows through the duct 21 and with which control is carried out depends upon the pressure in the chamber 33; it exerts no force on the piston combination 25, 26, 27. As a result of this a very favourable operation of the control valve which avoids errors is obtained.

Also when the piston rod 9 is clamped, the device described is of great importance since a constant position of the piston within, for example, 0.1 $\mu$ can never be ensured by clamping only. Together with the control valve this is indeed possible.

The device may be used in machine tools for extremely accurate machinings, for example, in precision lathes, milling machines and grinding benches, but application is also possible in other fields of technology. Special reference is made in this case to microtomes, electron microscopes measuring arrangements and the like.

Finally, it is obvious that the piston can alternatively be provided with a piston rod on both sides, the second piston rod serving, for example, for an extra centering of the piston or also providing work.

What I claim is:

1. A control system for sealing a hydrostatically journaled working piston against the wall of a cylinder carrying said piston, said cylinder being closed at both ends by first and second cylinder covers, said working piston having a hydrostatically journaled piston rod attached to at least one of its end faces and extending through said second cylinder cover for supplying effective work, a first end space formed between one of said end faces of said working piston and said first cylinder cover, and a second end space formed between the other end face of said working piston and said second cylinder cover, said system comprising means communicating with said first end space for supplying fluid under pressure thereto so that said pressure acts on one end face of said working piston means communicating with said second end space for supplying fluid under pressure thereto so that said pressure acts on the other end face of said working piston, a first circumferential groove located on the circumferential surface of said working piston adjacent the end face thereof broadening said first end space, a second circumferential groove located on the circumferential surface of said working piston adjacent said second end space, a plurality of shallow bearing chambers about the circumferential surface of said working piston for hydrostatically journaling said working piston in said piston carrying cylinder, said chambers being located between said first and second circumferential grooves, first duct means communicating between each of said bearing chambers and said second end space, a cylindrical body secured within said piston being closed at one end thereof, first, second and third pistons within said body being spaced apart and axially movable therein, means connecting said first and second pistons and means connecting said second and third pistons said connecting means having diameters smaller than the diameters of said pistons, a first middle chamber being formed between the first and second pistons, a second middle chamber being formed between the second and third pistons, a first end chamber formed between the end face of said first piston and the closed end of said body and a second end chamber bound by the end face of said third piston, an aperture in the wall of said body communicating with said first middle chamber, second duct means communicating with said aperture and said second groove, an outlet port comprising a recess on the surface of said second piston communicating with said first middle chamber, an annular chamber formed between the circumferential surface of said second piston and the inner wall of said body in communication with said recess, said outlet port being adjustable in size by the relative position of said pistons within said body, third duct means in constant communication at one end thereof with said annular chamber regardless of the position of said pistons, said third duct means communicating at its other end thereof with a pressure which is less than the pressure acting on both end faces of said working cylinder, fourth duct means in said working piston communicating between said first groove and said first end chamber, fifth duct means communicating between said second end chamber and said second end space, the diameters of said first and third pistons being unequal so that the end surfaces thereof have the same ration of surface area as the corresponding end surfaces of said working piston so that the pressure exerted on both ends of said working piston is the same as the pressure exerted on corresponding ends of the piston assembly within said body.

2. A control system for sealing a hydrostatically journaled working piston against the wall of a cylinder carrying said piston, said cylinder being closed at both ends by first and second cylinder covers, said working piston having a hydrostatically journaled piston rod attached to at least one of its end faces and extending through said second cylinder cover for supplying effective work, first and second end spaces formed between the first and second cylinder covers and the respective end face of the working cylinder, said system comprising means for supplying fluid pressure to said first and second end spaces for acting on the respective end faces of said working cylinder, first and second circumferential grooves on the surface of said working piston adjacent the respective first and second end spaces, a plurality of shallow bearing chambers circumferentially arranged on the surface of said working piston in between said first and second grooves for journaling said piston within said cylinder, a duct having a restriction forming a fixed resistance communicating between each of said bearing chambers and said second end space, a control element secured within said working piston and longitudinally extending therethrough, said control element comprising a cylindrical body and a piston assembly movably mounted for axial adjustment within said body, duct means communicating between said second groove and atmospheric pressure, an adjustable outlet port within said duct means for varying the resistance to fluid flow therethrough, said outlet port being adjustable by the relative position of said piston assembly within said cylinder body, means communicating with said first groove so that the pressure within said groove is equal to the pressure within first end space and acting on the piston end face therein, and opening within said body so that a differential pressure equal to the difference in pressure acting on both end faces of said working piston is exerted upon the piston assembly in said cylindrical body, whereby said piston assembly will be adjusted so as to vary the amount of resistance offered by said outlet port and thereby control the amount of fluid flow through said duct means communicating between said second groove and atmospheric pressure and thereby equalize the pressure acting on both end faces of said working piston and reduce the amount of fluid flow along said piston surface.

3. The control system according to claim 2 wherein said cylindrical body is closed at one end and is secured within said working piston so as to be fluidtight therein, said piston assembly comprising first, second and third pistons being spaced apart and connected together by connection rods, a chamber being formed between each of said pistons, an aperture located within the wall of said cylindrical body and communicating with the chamber between said first and second pistons, said duct means communicating between said second groove and the atmosphere comprising a channel extending between said second groove and said aperture in the wall of said cylindrical body, an annular groove formed in the surface of the inner wall of said cylindrical body and bound by the surface of said second piston, a channel communicating with said annular chamber and the atmosphere, said outlet port comprising a slot-shaped recess on the surface of said second piston and communicating with said annular chamber and the chamber between said first and second pistons to thereby complete said duct means.

4. The control system according to claim 3 wherein said opening in said cylindrical body forms a communication to said second space formed by said second cylinder cover and one of the end faces of said working piston so that the pressure prevailing in said second space acts on said piston assembly, said system further comprising an end chamber within said cylindrical body formed between the end face of said first piston and the closed end of said cylindrical body and means communicating between said end chamber and said first groove.